United States Patent [19]
Dearth

[11] 3,750,166

[45] July 31, 1973

[54] PILOT DATA SYSTEM

[76] Inventor: James Slocum Dearth, 323-C Fashion Park Pl., Orange, Calif. 92666

[22] Filed: June 11, 1971

[21] Appl. No.: 152,201

[52] U.S. Cl. .............................................. 343/6 TV
[51] Int. Cl. .............................................. G01s 9/00
[58] Field of Search ......................... 343/6 TV, 6.5 R

[56] References Cited
UNITED STATES PATENTS

| | | | |
|---|---|---|---|
| 3,195,125 | 7/1965 | Reitler............................... | 343/6 TV |
| 3,121,223 | 2/1964 | Roberts et al..................... | 343/6 TV |
| 3,212,082 | 10/1965 | Robinson, Jr. et al. .......... | 343/6 TV |
| 3,415,946 | 12/1968 | Bedford, Jr........................ | 343/6 TV |
| 3,298,022 | 1/1967 | Smith ................................ | 343/6 TV |

*Primary Examiner*—Benjamin A. Borchelt
*Assistant Examiner*—G. E. Montone
*Attorney*—James Slocum Dearth

[57] ABSTRACT

This Pilot Data System is capable of automatically providing the pilot of a vehicle continuous, immediate, information on the geographic position of his vehicle, the geographic position and movement of other craft, the location and height of natural and man-made obstacles, and other pertinent data.

This system is primarily intended for use by aircraft, but is not restricted to any specific type of vehicle. When used for aircraft, this system automatically determines all aircraft positions within its coverage area by a combination of low-cost aircraft data link and a ground station. It sorts aircraft by altitude, generates synthetic displays for increments of altitude, together with map underlays on which the aircraft appear, and transmits the resulting displays for pilot use. Each display gives the pilot a continuous, dynamic, geographically correct, picture of all air traffic at the altitude he selects. His own aircraft, suitably identified, appears on the display increment for his altitude.

The system also provides a "Search and Rescue" system.

15 Claims, 8 Drawing Figures

PILOT DATA SYSTEM

BRIEF SUMMARY OF THE INVENTION

This invention proposes to alleviate the present air traffic problems by providing the pilot sufficient information in the cockpit by use of which he can navigate, avoid collisions, avoid natural or man-made obstructions, avoid any designated areas, and maintain separation from other aircraft. In addition, it will provide on the ground and in the air, the location of any aircraft that has crashed or is in distress. This will reduce the need for and the amount of services now provided from the ground for IFR traffic, lessen communication requirements, and will make the information available to all aircraft regardless of weather conditions.

This invention provides a pilot, in one easily interpreted display, all the information he needs about the "real world" that is necessary for the safe conduct of his flight (this does not include aircraft systems performance, i.e. engine). This information is presently either not available, or if available, must be obtained from several sources, utilizing separate equipment and radio communication. Much of this information, particularly air traffic control instructions, is presently in verbal form.

The novel features of this invention lie in the combination of methods of collecting, combining, collating, generating, transmitting, and displaying the information in a uniquely useful and previously unavailable manner. This invention does not specifically refer to special electronic techniques; these will be the subject of separate patent applications.

The system provides the following capabilities:
1. Collision avoidance
2. Area navigation
3. Obstruction avoidance (terrain and other)
4. Area avoidance
   a. Climb and descent corridors
   b. Restricted areas
   c. Control areas
5. A search and rescue system Features of the system are:
1. Aircraft equipment inexpensive
2. Complexity placed on the ground
3. All aircraft appear—aircraft size is irrelevant
4. The aircraft display receiver is optional. Cost varies with the features desired.
5. Can handle 1,200 or more aircraft simultaneously
6. Does not impinge on present Air Traffic Control
7. Meets most Air Transport Association collision avoidance (CAS) requirements
8. Conserves on bandwidth

BACKGROUND

All air traffic in the United States is controlled by the Federal Aviation Agency (FAA), an agency operating under the Department of Transportation. It is assisted by the provision of aviation meteorological data by the U.S. Weather Bureau. Formal organizations exist within these agencies for the dissemination of aviation weather information and for the control of air traffic.

Federal Aviation Regulations (FAR), issued by the FAA, govern aircraft flights and are based on the separation of flights into two categories determined by prevailing weather conditions:
1. Visual Flight Rules (VFR) for flights conducted by visual reference to the ground or water
2. Instrument Flight Rules (IFR) for flights conducted by reference to instruments FAA exercises its traffic control by the following means:
1. Designation of controlled airspace (airways, airport traffic areas, control zones, etc.)
2. Provision of navigation facilities
3. Air Traffic Control Centers to handle IFR traffic. This is accomplished by use of radar and radio communications.
4. Flight Service Stations (FSS), which provide weather information by broadcast or on request, and flight following for VFR aircraft on flight plans.

Under VFR, pilots may fly essentially as they wish with or without a flight plan. They are uncontrolled. The Flight Service Station will provide weather, accept position reports if a flight plan has been filed, and institute a search if a flight on a flight plan is overdue. Limited radar service is available from Air Traffic Control Centers if the workload permits. Pilots are individually responsible for seeing and avoiding other aircraft in accordance with the FAR setting forth rules for right-of-way.

Under IFR, flight plans are mandatory, regardless of weather conditions, and pilots must conduct their flights strictly in accordance with instructions issued to them by radio by Air Traffic Control. However, at all times that weather conditions permit, pilots are responsible for seeing and avoiding other aircraft.

As of Dec. 31, 1969, there were 130,806 active General Aviation aircraft, 3008 Airline aircraft, and an unknown number of military aircraft (estimated at upwards of 20,000), for a conservative total of at least 150,000 aircraft, using the airspace and facilities. In 1969 general aviation carried 171,120,620 passengers, the airlines 144,320,000. In 1968 the number of flights by category was as follows:
Air carrier 5.3 million
General aviation 24.9 million
Military 5.5 million Instrument operations for each category were:
Air carrier 4.3 million
General aviation 1.2 million
Military 1.5 million Projected numbers of aircraft (FAA 10-year plan) are for 1980: General aviation 225,000; Air carrier 3,800; military unknown.

Reasons for the present problems in air traffic:
1. Lack of information for the pilot in the cockpit, necessitating voice communications with the ground.
2. Slowness of voice communications
3. Saturation of present communications and navigation facilities by the growth in IFR traffic
4. Sheer growth of number of aircraft
5. Limitations of radar
6. Natural concentration of air traffic between large population centers, aggravated by the creation of airways, which further concentrate the traffic into narrow lanes
7. Difficulty in seeing other aircraft due to problems of conspicuity, cockpit visibility, aircraft blind spots, pilot inattention, and cockpit workload In an effort to cope with these problems, FAA has designated high density areas with special requirements for entering them, has set up a system for allocating flights to and from certain airports, and has introduced Terminal Control Areas (TCA) at others. The trend is for FAA to require more, and more sophisticated, equipment on all aircraft in order to them to operate in the present radar and communications environment.

It is postulated that the program outlined in the National Aviation System Plan published by FAA (the 10 year plan) will not adequately handle the projected growth in air traffic.

On page one of the Report of Department of Transportation Air Traffic Control Advisory Committee (the Alexander Report) Vol. 1, the philosophies of "cockpit management" and "centralized management" of air traffic control were discussed. The committee concluded that the cockpit management was not feasible using the equipment available, which they enumerated. Based on their premises, I agree. However, it is further postulated that the Pilot Data System will make the cockpit management concept feasible and will be capable of handling the anticipated growth in air traffic.

Figure 1:
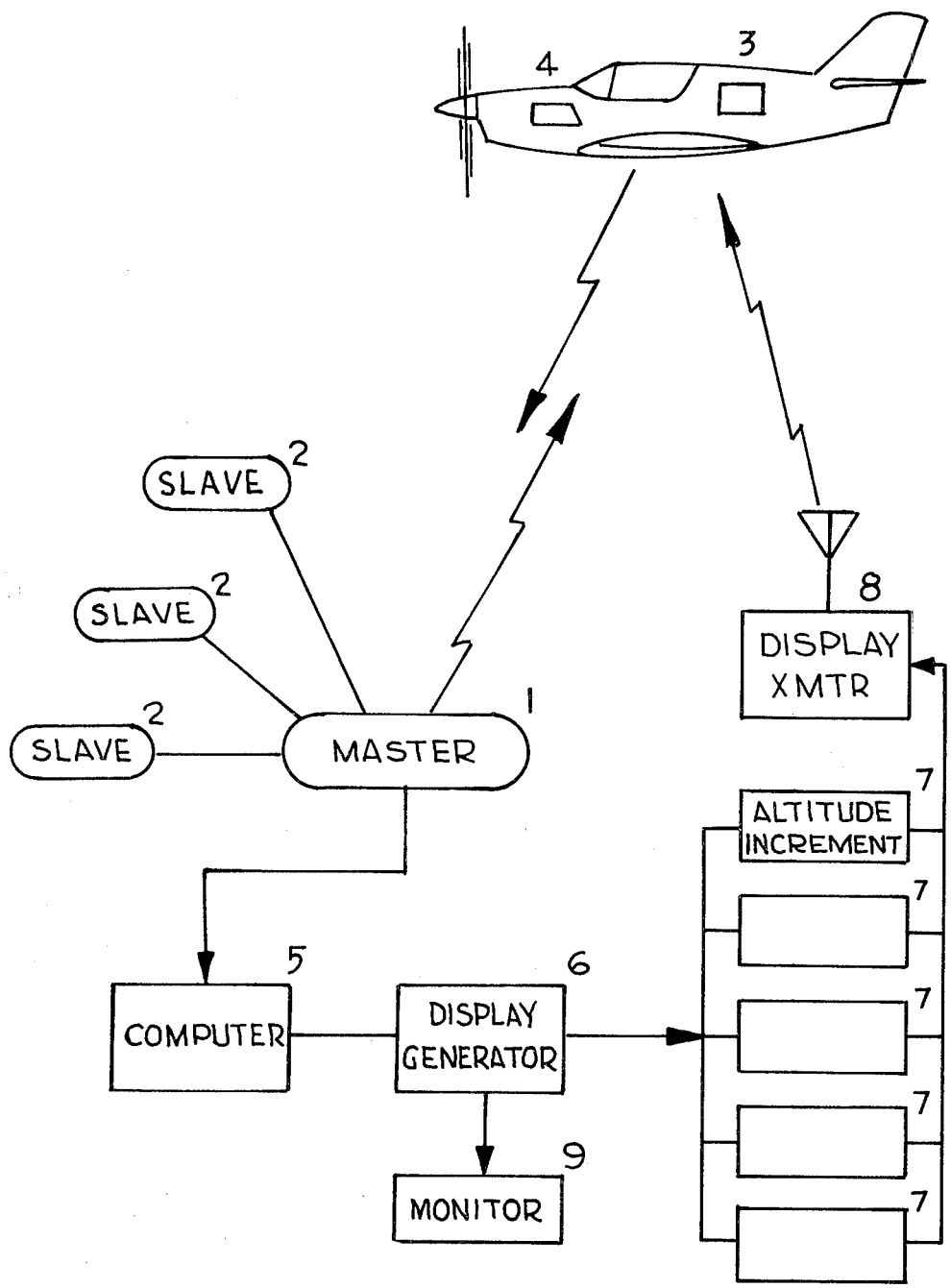
FIG. 1 is a block diagram of the pilot data system where the position-determining-network is located on the ground.

One specific system, shown in FIG. 1, for aircraft, described to emphasize the salient features of this invention, consists of a ground position-determining network, a computer, a display generating device, a display transmitting device, and in the aircraft, a data link and cockpit display.

Figure 2:
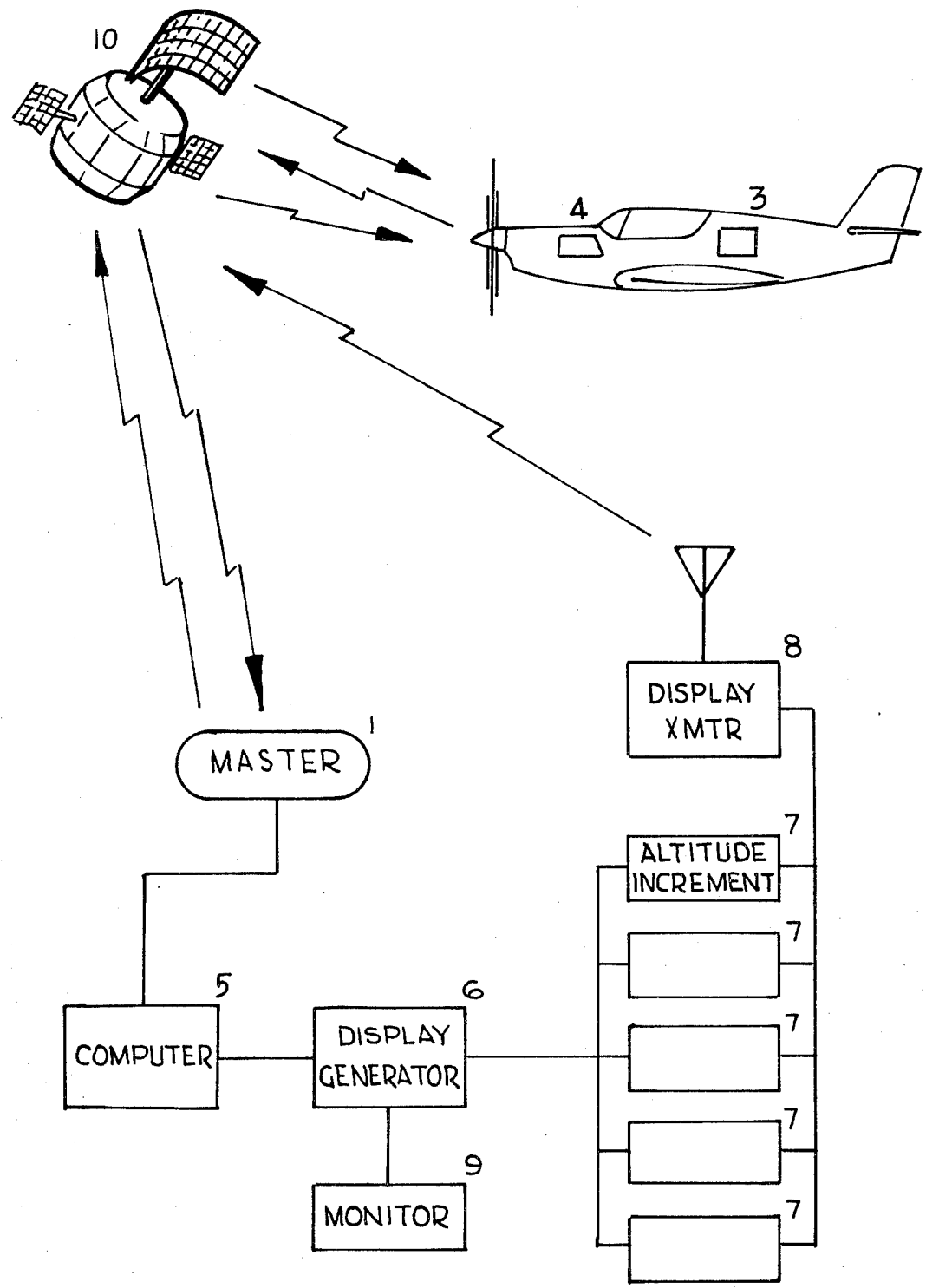
FIG. 2 is a block diagram of the pilot data system where the slave stations are satellites.

The ground station consists of a master station 1 and three slave stations 2 situated approximately symmetrically and roughly 20 miles apart. The aircraft contains a data link 3 and display equipment 4. In operation, the master station 1 interrogates all aircraft via their data links 3 and each aircraft reports its identification and altitude via data link 3. The master station 1 and each slave station 2 receives the reply. The bearing and distance of each aircraft from the master station 1 is determined by time delay. This data, now representing the three-dimensional position of each aircraft, is fed to a computer 5, which sorts the aircraft by altitude and routes the data to the display generator 6. The display generator 6 positions each of the aircraft symbols on the correct one of a number of altitude increment displays 7. In addition, the display generator 6 produces a map for each altitude increment display 7 together with correct detail unique to each altitude increment. All of the altitude increment displays 7 are transmitted by the display transmitter 8. The pilot of each aircraft selects the altitude increment display 7 suitable to his purpose and receives it on his cockpit display 4. This selection is made by use of controls on the cockpit display equipment 4. A ground monitor 9 provides information for ground personnel. An alternate method, see FIG. 2, is to place satellites (three minimum) in the communications loop between the ground station and the aircraft to eliminate line-of-sight limitations. This would also eliminate the slave stations and also reduce the number of ground stations required to cover a large geographic area. Both systems, ground and ground plus satellite, operate in essentially the same manner: interrogation, aircraft report, position determination, data processing, display generation, display transmission, and aircraft reception of display.

Operation of the Ground Plus Satellite System

The ground station consists of an interrogator/receiver with timing circuitry 1, a computer 5, a display generator 6, and a display transmitter 8. The airborne components are the satellites 10, an aircraft data link 3, and an aircraft display receiver 4. The ground interrogator 1 interrogates the aircraft data link 3 via the satellites 10 and the aircraft data link 3 reports the aircraft identification and altitude via the satellites 10 to the ground station 1. The ground station 1 receives the replies and from the time delay introduced by the different radio paths from the widely separated satellites is able to compute the bearing and distance of each aircraft. The computer 5 processes the data from the aircraft and routes the information to the display generator 6. The display generator 6 positions each of the aircraft symbols on the correct one of a number of altitude increment displays 7. In addition, the display generator 6 produces a map for each altitude increment display 7 together with the correct detail unique to each altitude increment. All of the altitude increment displays 7 are transmitted by the display transmitter 8 via the satellite 10 to the aircraft display receiver 4. The pilot of each aircraft selects the altitude increment display 7 suitable to his purpose and receives it on his cockpit display 4. This selection is made by use of controls on the cockpit display equipment 4. A ground monitor 9 provides information for ground personnel use.

Figure 3:
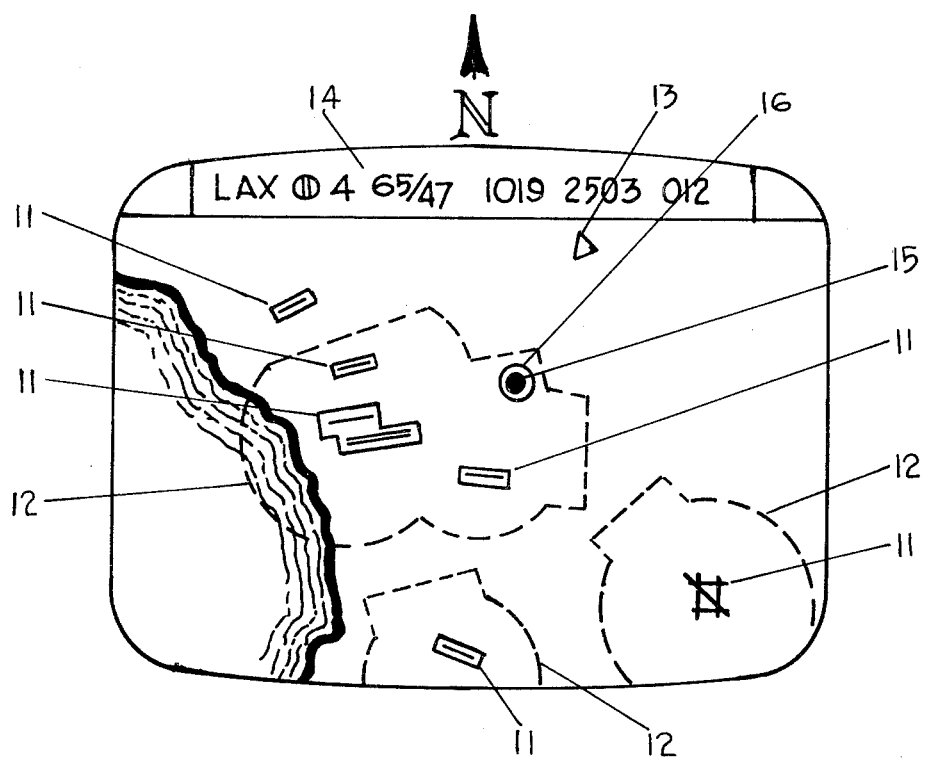
FIG. 3 shows the display on a 25-mile scale with detail shown as it would appear north-oriented.

FIG. 3 shows a representation of the pilot display which consists of a map oriented with north at the top and showing airports 11, control zones 12, obstructions 13, a teletype weather sequence 14 and a symbol for your own aircraft 15 with identifying circle 16. The map shown covers a 25-mile area.

Figure 4:
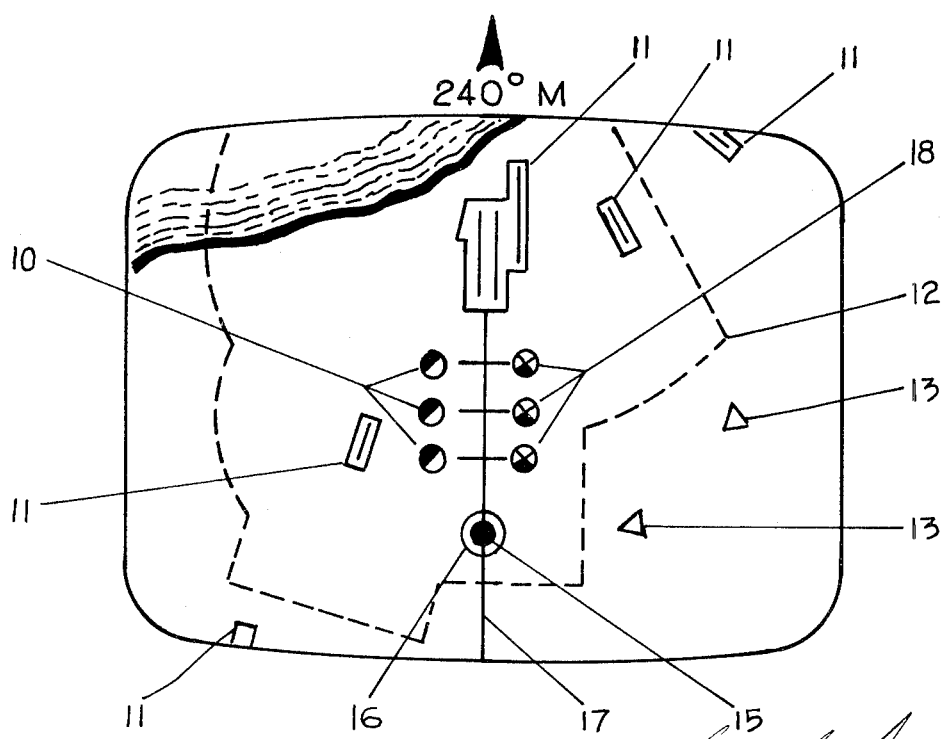
FIG. 4 shows the display as it would appear on a 12.5-mile scale and oriented to the aircraft heading.

FIG. 4 shows a portion of the same map as FIG. 3 covering a 12.5-mile area including the airport, enlarged to fill the whole display, and with the map oriented with the aircraft heading. The aircraft symbol 15 with identifying circle 16 in this case is shown making an approach to runway 24R. Airports 11, the control zone 12, obstructions 13, runway centerline extended 17, distance from runway threshold symbols 18, and minimum altitude symbols at each distance 19 are shown.

Figure 5:
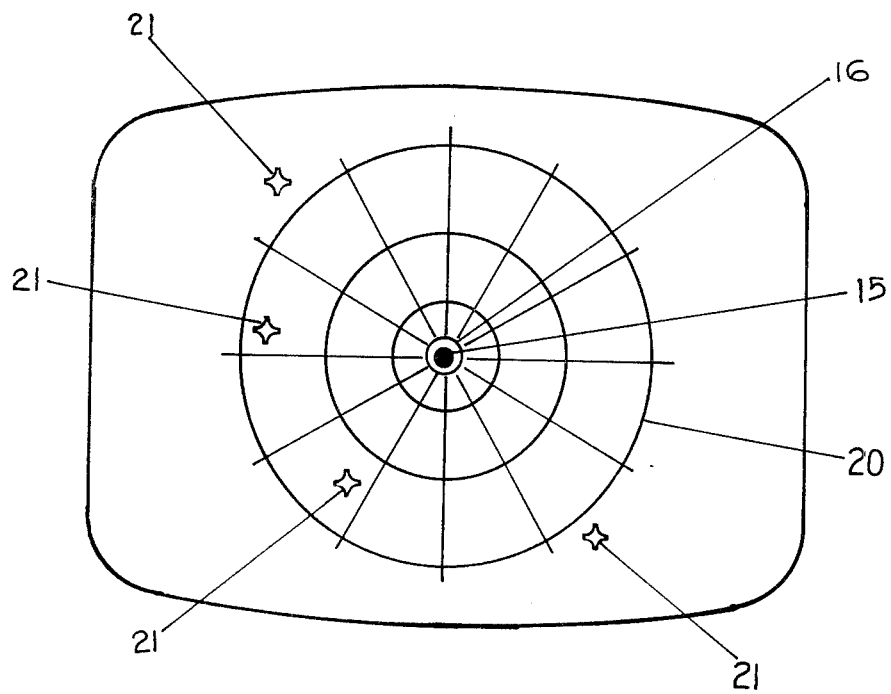
FIG. 5 shows the display, with map detail omitted for clarity, showing own aircraft at the center, other aircraft, and the polar grid activated.

FIG. 5 shows the pilot's display when it is desired to place one's own aircraft at the center. When this function is selected, any aircraft within the selected altitude increment which approaches within the range in use, is displayed. Shown are own aircraft, 2, the polar grid 20, and other aircraft symbols 21.

Figure 6:
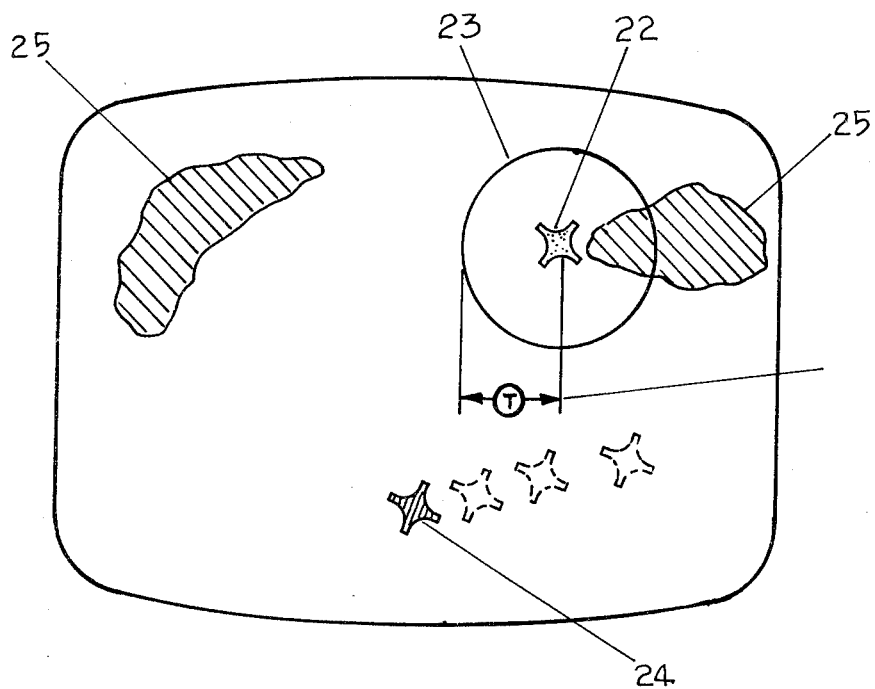
FIG. 6 shows the display with the crash symbol, circle of uncertainty, in-flight emergency signal, and terrain obstructions displayed.

FIG. 6 demonstrates the use of the Emergency signal in two cases, that of a crash, and that of an airborne emergency. The crash site symbol 22 is shown as is the circle of uncertainty 23. Both symbols are automatically placed on the display by the computer after a pre-set interval in which no reply has been received to the interrogation of the aircraft. The radius of the circle of uncertainty is a function of the pre-set interval and the ground speed of the aircraft. The airborne emergency symbol 24 is activated by the pilot and continues to track the distressed aircraft's position. An outline 25 of the appropriate contour line of terrain for that altitude with interior cross-hatched, is shown.

Figure 7:
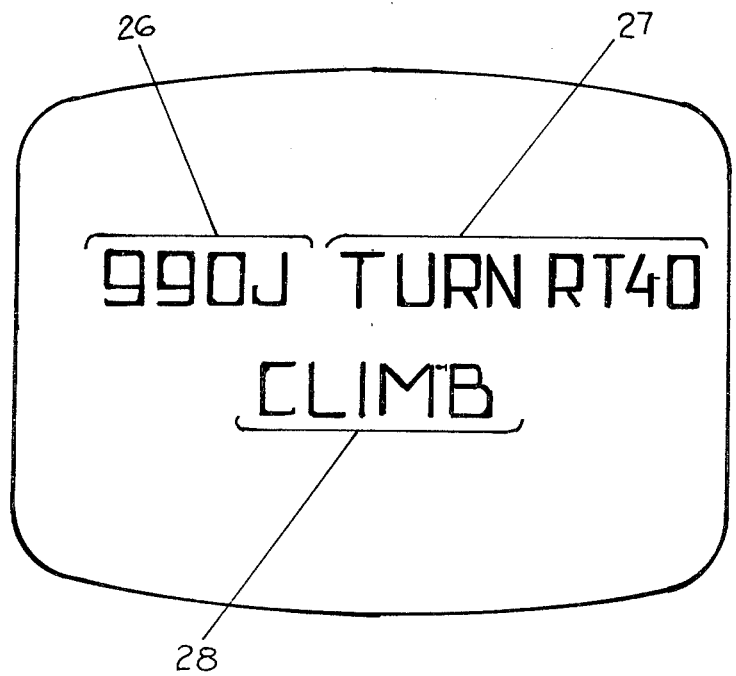
FIG. 7 shows the display with collision-avoidance instructions issued from the ground computer.

FIG. 7 illustrates the pilot's display when a ground-based computer issues a collision avoidance instruction. Aircraft identification 26, turn command 27, and altitude change command 28 are shown.

Figure 8:
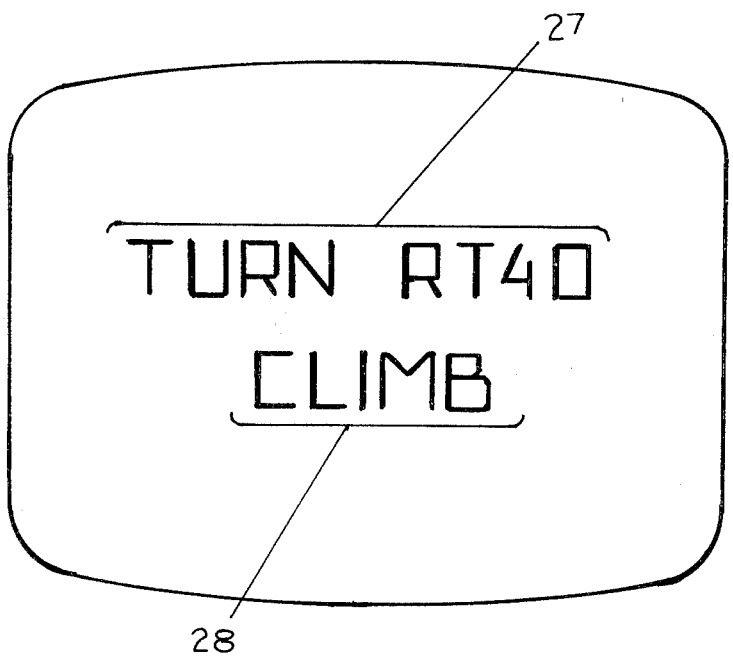
FIG. 8 shows the display with collision-avoidance instructions as issued by the on-board computer.

FIG. 8 shows the pilot's display when the computer in his own aircraft issues the collision avoidance instructions. In this case no identification is necessary so that the turn signal 27 and altitude change signal 28 are shown. In this case the avoidance instructions pre-empt the display and all other signals are blanked out while the avoidance instructions are displayed.

DETAILED DESCRIPTION

The Pilot Data System automatically determines vehicle position for all vehicles suitably equipped within the system coverage area, and provides to each vehicle operator an easily interpreted display of his geographic position and movement, the geographic position and movement of all other vehicles suitably equipped, the geographic position and height of obstacles, both natural and man-made. It also provides "search and rescue" capabilities.

The specific system described is for aircraft and is a system that can encompass a range of complexity; from a simple, low-cost, manually operated equipment for small aircraft, to automated equipment for the most sophisticated aircraft. The differences lie mainly in the complexity and degree of automation in the aircraft display equipment.

The system is comprised of a ground station, and equipment in each aircraft using the system. The ground station consists of a position-determining network, a computer, a display generator, a display monitor, and a display transmitter. The position-determining network consists of one master and three slave stations sited symmetrically. The aircraft equipment consists of a data link and a display receiver.

In operation, the master station interrogates all aircraft via the data link; each aircraft reports its identification and altitude via the data link. The master and slave stations each receive the reply. The bearing and distance of each aircraft from the master station is determined by time delay methods obvious to those well versed in the art. This data, now representing the three-dimensional position of each aircraft, is fed to the computer, which sorts the aircraft by altitude and routes the data to the display generator. The display generator positions each of the aircraft symbols on the correct one of a number of altitude increment displays.

In addition, the display generator produces a map for each altitude increment display together with correct detail unique to each altitude increment display. All of the altitude increment displays are then transmitted by the display transmitter. The pilot of each aircraft selects the altitude increment display suitable to his purpose and receives it on his cockpit display. This selection is made by use of controls on the cockpit display equipment.

An alternate to the use of slave stations at the ground station is to place a number of satellites in the communications loop between the ground master station and the aircraft. Since the satellites may more readily be placed farther apart than the ground slave stations, the accuracy of the time delay measurement would be enhanced, and thus the system accuracy also. The use of satellites would eliminate line-of-sight limitations due to terrain, and additionally, decrease the number of ground stations required to cover a large geographic area. This would permit coverage of ocean areas. In operation, the satellites would reflect, or alternately, amplify and/or retransmit both the data link transmissions and the display transmissions.

Both systems, ground, and ground plus satellites, operate in essentially the same manner; interrogation, aircraft report, data processing, display generation, display transmission, and aircraft reception of the display.

Several alternate techniques exist for electronically performing each of the above functions and are well known to persons skilled in the fields of electronics, communications, navigation, and displays.

One example for each:
Synchronizing master/slave—Loran techniques
Interrogating message and reply—phase shift keying of digital data
Interrogation methods
  Roll call
  Straight broadcast
  Single frequency
  Multiple frequencies, each keyed to a type of aircraft (air carrier, military, for example)
Return signal timing—timing circuits
Sorting and data processing—computer program
Display generator—fixed data on magnetic tape, dynamic data input from the computer
Display transmission—standard TV or deep space data transmission techniques
Aircraft reception—modified TV receiver Functional components of the various equipments are as follows:

Ground station

| Master | Slave |
|---|---|
| Transmitter | Receiver |
| Receiver | Communication |
| Time delay circuitry | with master |
| Computer | |
| Display generator | |
| Display transmitter | |
| Display monitor | |

Aircraft

| | |
|---|---|
| Data Link | Display Receiver |
| Receiver/transmitter | Receiver |
| Sensors | Display CRT |
| Analog/digital converter | Symbol generator Tracking circuitry |
| Message circuitry | |

Alternate—Ground station plus satellites
Ground station—same as above, less slave stations
Aircraft—same as above
Satellites—Physical reflectors, or alternately, receiver/transmitter, and power supply The various major components of the system operate as described below:

Position-Determining Network - Ground

This network consists of a master station and three slave stations, each with their associated radio equipment and antennas, sited approximately symmetrically, and tied together by suitable communications. The master station interrogates all aircraft via data link and sends a timing signal to each slave. Bearing and distance of each aircraft is determined by geometry from the differences in time of return to each of the stations of the aircraft reply. The computer performs the calculations. The fixed distance between each slave and the master station is set into the timing circuits as a constant.

Position-Determining Network - Ground Plus Satellites

This system is the same as that above except that satellites replace the slave stations and do not require the timing synchronization. The satellites are of the synchronous type and may reflect only, or may amplify, and/or retransmit the data link and display signals to and from the ground and aircraft on either the same or a different frequency than that on which they receive them.

Data Link

The data link will handle digital data in binary form. Both ground and air data link equipment characteristics will be closely tailored to the computer and software requirements. The aircraft data link will have provisions for setting in preselected data such as the aircraft identification. Airborne equipment will have built-in sensor(s) (separate from the aircraft instruments) with digital encoders for data link transmission. Provision may be made for pilot-setting of the built-in altimeter, and digital read-out to the pilot may be provided.

Several methods of transmission of the digital data are available. Phase shift keying is presently preferred. Transmission may be on either a single frequency or on multiple frequencies, depending on aircraft traffic density. If more than one frequency is used, each can be allocated to a specific aircraft type: i.e. air carrier, military aircraft, general aviation, or, alternately, jet, helicopter, single engine, multi-engine. Altitude allocation is possible but appears to complicate the airborne equipment unnecessarily.

Either a single interrogation for all aircraft or a "roll-call" type interrogation may be used. Either method is compatible with multiple frequency use.

An aircraft enters the system when the single interrogation method is used, merely by being interrogated and answering. In the roll-call method, a message format announcing the aircraft identification will be placed in sequence with the equipment "ON" switch and will broadcast until interrogated by the ground station, then switch to normal operation.

The preferred method to get out of the system once the flight is completed, using either system, is to send a message format announcing "flight completed" in sequence with the "OFF" switch for a pre-determined period before the power is cut. This precludes activation of the ground computer "EMERG" procedure.

Since the ground based computer will have a preset program that generates an "EMERG" signal (this will be described under the computer) if an aircraft fails to answer for a prescribed time period, the airborne data link will have a pre-coded message that can be activated by the pilot to indicate an emergency. This will appear very prominently on the ground monitor display, with other computer-generated audio/visual signals also used to call attention of ground personnel to the emergency. This circuitry may incorporate a g-sensing device to activate it in the event of a crash.

Computer

The computer will receive the data from the position-determining network, determine the aircraft geographic position expressed in relation to the master station, sort the aircraft by altitude and route the data to the correct one of a number of altitude increment displays. The data rate for updating information on aircraft is presently chosen as once per second.

Aircraft climbing or descending will be routed by the computer to the display corresponding to their actual altitude and also to the altitude increment display to which they are proceeding; either the one next above or next below, as appropriate. Either a rate of change of altitude or a fixed altitude differential, or combination of both, may be used as a condition in the computer program for such multiple altitude increment display. This will prevent a pilot from being shocked at the sudden appearance of another aircraft at close range.

Access to the displays via the computer will be provided for the input of weather and other temporary information. Provision will be made for the computer to project the track of an aircraft should the aircraft data link fail and communications be established with the aircraft by voice.

The computer will cause the display generator to generate and display a very distinctive symbol when an aircraft fails to answer the interrogation for a preset period of time or when a pilot activates the "EMERG" signal of the aircraft data link. In the event the aircraft response ceases, indicating either equipment failure or a crash, after a preset interval the "EMERG" signal would be displayed and remain fixed at the last reported aircraft position. Should the "EMERG" signal be activated by the pilot, indicating an in-flight emergency, the signal would continue to be displayed but the computer would continue to track the aircraft. In either case voice communications would be attempted. Should it be concluded that a crash has occurred, a search may be instituted immediately. The last known position will remain displayed for both ground and aircraft personnel. The search area can be delineated (by symbol if desired) to within a circle whose radius is determined by the aircraft ground speed and the pre-set interval between last communication and display of the "EMERG" signal; i.e. one minute at 120 knots equals a two-mile radius circle of uncertainty. Pilots using the display can proceed directly to the site.

A more complex and sophisticated system is feasible in which the computer would continuously inspect the conflict potential of each aircraft versus each other aircraft using some selected criteria or combination thereof as a specific distance between aircraft or time to close. In cases of potential conflict the computer would issue instructions via the cockpit display for the proper action to be taken by each of the aircraft concerned. Instructions, as well as action taken by pilots in the absence of instructions, would be based on right-of-way rules specified in FAR. An alternate, and much less complex system, is one in which a small computer would be part of the aircraft cockpit display, and would provide warning and collision avoidance instructions for that aircraft. This method will be discussed further under the cockpit display description.

Display Generator

Displays may be either black and white or color. It is planned to generate and transmit them in color and leave the option of type of airborne receiver to the aircraft owner.

Displays will be generated by video recording using a TV camera, a colored map, prepared especially for each altitude increment of the area covered, with detail tailored to that altitude increment. The map for each altitude increment will contain major topographic features, cities, airports, and terrain and obstacles unique to that altitude. Airports in particular will be carefully delineated for maximum clarity on the expanded range scales. Aircraft position information for each altitude increment will be mixed with the fixed information of the corresponding altitude increment of the video recording to produce each of the displays that are then transmitted simultaneously.

The display generator will generate a series of displays based on increments of altitude and generally following FAA procedures: 1000 foot increments to 29,000 feet, 2000 foot increments to 39,000 feet, then one display for 40,000 feet and above. Each altitude increment display will be a plan view (map) of the area covered, with a depth equal to the altitude increment selected, and will display the information unique to that increment. The altitude increment approach was selected to reduce the collision avoidance problem to manageable proportions, based on the fact that collision threats arise between aircraft at the same altitude and those climbing and descending; for a collision to occur, the altitude differential between the aircraft must closely approximate zero. Conversely, an aircraft flying level at 5,000 feet is no threat to one flying level at 10,000, or to one making an approach to a sea level airport.

Each altitude increment display consists of a map, terrain and natural obstacle information, aircraft symbols for aircraft at that altitude in their correct geographic position, weather information, and temporary data.

Altitude increment displays will be referenced to mean sea level by the ground equipment. The altimeter in the aircraft data link equipment will be set for pressure altitude (29.92 inches Hg).

The map portion of the display lends itself to wide flexibility in terms of information displayed. Geophysical features, such as coastlines, rivers, mountains, and cities will be essential, as will information such as airports and restricted areas. Since the displays use no raw data they can be kept crisp and clean.

There will be two types of data for each altitude increment display; fixed and dynamic. Fixed information will consist of general data such as basic geophysical features, and data unique to that altitude increment, such as obstructions and terrain protruding into that altitude and displayed as contour lines with the center area cross-hatched, climb and descent corridors, restricted areas, and like information. Dynamic information will consist of aircraft symbols, weather information, and other temporary information.

Fixed information for each altitude increment will be prepared separately, mixed with the dynamic data and fed to the display transmitter. The fixed information may be stored on tape or scanned directly from a prepared map. The complete display may be transmitted as an integral display, or fixed and dynamic information may be transmitted separately at different repetition rates.

Weather information for the area, hourly weather sequences or ATIS data for airports in the coverage area, may be placed in suitable portion of the display. Severe weather warnings and thunderstorms may be outlined on the display in their correct position. Sequence reports would appear one at a time and the rotation would be continuous.

Access to the displays for adding, changing, or deleting information would be through the computer. The display generator can generate a wide variety of symbols, from alpha-numeric to special purpose (such as Emerg.) for almost any purpose. Uniform symbols for aircraft, unique symbols for different types of aircraft, symbols that can display aircraft heading, identification, and flight numbers, are examples.

Monitor displays will be available at the ground station and outputs will be available for the purpose of transmitting the displays to other locations. Should it be so desired, it would be feasible to transmit the appropriate displays in sequence to an airline operations office where a transcontinental flight could be observed from takeoff to touchdown.

Display Transmitter

The display transmitter will transmit all of the altitude increment displays simultaneously. Several methods are possible but TV is favored because it will permit the airborne display receiver to be essentially a TV receiver with maintenance readily available almost everywhere.

Using this method, each of the displays (approximately 30) can be transmitted once per second. The area of system coverage may require a change in the number of lines in the TV system, depending upon the resolution desired. For example, if a standard 525 line TV system is used to transmit a display representing an area 100 nautical miles square, 5.25 lines would represent one mile, and the resolution would be just over 1000 feet (1142.8) per line. Resolution becomes important as the airborne receiver is used on smaller range scales.

Aircraft Display Receiver

The aircraft display receiver will receive and display, by a method compatible with the ground transmitter system, the information transmitted from the ground. By means of display controls, the operator may select the Pilot Data System ground station, the altitude increment display, the area coverage or portion thereof, that he desires.

This display will permit detection and timely avoidance of other aircraft even if they are not visually sighted (astern and overtaking, for example). It will overcome the difficulty of visually sighting them due to various factors such as cockpit visibility, blind spots, conspicuity, contrast and meteorological visibility.

Basic to all the variations possible in the display equipment will be access by the pilot to the whole area of station coverage, a means of selecting an adequate number of altitude increments, a means of tracking his own aircraft for navigation and identification, and a means for determining relative movement and distance between his own and other aircraft.

A wide range of flexibility in aircraft display receiver features is possible, with the cost of the equipment varying with added extras. The basic equipment may have only one range scale for example, altitude increment selection to 15,000 feet, manual tracking of own aircraft, and edge-lighted polar grid overlay. For additional cost, the following additional features and capabilities can be made available:

Various range scales
A continuously variable range scale
All altitude increment selection
Automatic tracking of own aircraft
Electronic range scale selection
Electronic polar grid generation
Selection of display orientation (fixed north or own aircraft heading)
Fixed display or own aircraft at the center
Ground speed readout
REST computer calculations (range, endurance, speed and time)
Automatic warning of collision threat
Instructions for collision avoidance
Selection of course for desired CPA (closest point of approach)

Display Area Coverage and Range Scales

The pilot will have access to the entire area of coverage provided by the station. In the case of the least expensive version of the equipment, this may consist of just one range scale. In more complex versions, the pilot will be able to select any one of a number of range scales (i.e. 5, 10, 25 miles). Suppose, for example, a plane flying at 5,000 foot altitude increment of the entire station coverage of 100 miles square. Suppose further that the pilot desires to enlarge a 10-mile square portion of the display. He selects a switch which causes the display to generate an area outline 10 miles square; with another control he moves this area outline to the area he wishes enlarged and pushes an "activate" button. The 10- mile area selected then is expanded to fill his whole display. Should he then select 4,000 feet for the altitude increment he desires, he would then receive the 4,000 foot altitude increment display for the area coverage at the range scale he has selected.

This is accomplished by modifying the sweeps of the full received area. The vertical sync of the display tube is delayed using a "one-shot" (Schmidt trigger), a controlled amount (pre-set for the range scale desired) from the vertical sync of the received pattern. The horizontal sync is likewise delayed a controlled amount. These delays locate the upper left corner and left edge of the display with respect to the full received pattern. Both analog and digital methods of sync control are well known in the art. The vertical and horizontal sweep of the CRT are controlled, thus giving the expanded size. This is done by methods well known in the art of expanded sweep generation.

The altitude selection is accomplished as follows:

Each of the altitude increment displays (approx. 30) is allocated one frame of the transmitted signal (30 frames/sec). The altitude selection control inserts a blanking pulse to shut off the receiver during the transmission of all but the selected frame. Persistence of the CRT phosphor can be adjusted to provide a solid picture.

Using the example just given, he could examine the traffic at the altitude below him prior to starting a letdown. In a like manner he can examine any area and any altitude within the station coverage at whatever scale he desires (within his equipment design limits). He can, for example, examine the traffic at a particular airport from any point within the coverage area. He will, of course, lose the picture of his own aircraft if he selects another area or altitude than that on which his aircraft appears, unless he has other display equipment.

Altitude Increment Selection

Altitude increment selection will be either manual or automatic at the pilot's option. In manual he may select the increment he wishes. In automatic, the altitude increment corresponding to the aircraft altitude, and therefore the display on which the aircraft appears, will be automatically selected and displayed as the aircraft climbs or descends. This will be accomplished by a tie-in to the altimeter in the aircraft data link. Provision will also be made to combine the displays of several contiguous altitude increments. The feature is included to permit the pilot on a parallel ILS approach to observe all the aircraft on both ILS courses during the entire approach.

Display Orientation

All displays are transmitted north-oriented.

The area and altitude increment selected may be presented in several ways. One or more may be provided, varying with the complexity of the equipment:

The display stationary and north-oriented. Using this method with a range scale less than the full station coverage, a pilot would re-select the area as described above, prior to flying off of the area in which his aircraft appears.

The display stationary but oriented to the aircraft course at the pilot's option. The operation would be the same as above, except have the advantage of placing the map and relative movements of other aircraft in perspective with the pilot's own aircraft axis. To accomplish this the display may be physically rotated, or the display may be electronically rotated synthetically or by physical rotation of the yoke deflection coil or deflection plates.

With the pilot's own aircraft at, or somewhat aft of the center of the display the area around the aircraft would then be shown at the range scale selected. The map would thus appear to be moving under the aircraft and other aircraft would appear when they came within the range selected. If a 10 mile range were selected, for example, all aircraft within 10 miles of the pilot's own aircraft would appear. The aircraft would be carrying a protective 10 mile area along with it.

The apparent motion of the map (necessary only on range scales other than the full received display) is accomplished in a conventional manner by inserting a $\Delta t$ delay in each successive frame, in both the vertical and horizontal sweep delay pulses that are used to create the range scales. This $\Delta t$ is continuously variable, and in effect matches the ground speed.

The pilot selects the N-S, E-W components of his ground speed by observing the movement of his own aircraft symbol with respect to the center of the display as he makes the adjustment. When the correct adjustment is made, the aircraft symbol will remain where placed.

Own Aircraft Tracking

The display will provide with symbol generating circuits a circle with which to designate one's own aircraft. Tracking may be manual or automatic. In manual, the pilot will have controls with which to set in course and speed for his flight. He superimposes the designating circle over his own aircraft symbol and, as the flight progresses, makes manual adjustments until the circle remains superimposed over his own aircraft symbol. A ground speed read-out is possible. Should he make a large course change, he would have to reposition the designating circle. In automatic, the pilot would position the circle once and the tracking would be done automatically by phase-lock-loop circuitry. A ground speed read-out would also be possible. If the ground station were of the type using satellites, the aircraft symbol would be available in the chocks and while taxiing, enabling the indentifying circle to be positioned on the ground.

Collision Threat Detection

A polar coordinate grid generated by symbol generating circuitry will be made available at pilot selection, with its origin at the aircraft's position and maintained there with phase-lock-loop circuitry. This grid makes it possible for the pilot to detect the relative motion and range of another aircraft (or obstacle) and to evaluate any potential collision threat almost immediately, whether the other aircraft has been sighted visually or not. Use of a long persistence phosphor on the display would leave a "tail" on the aircraft symbol, giving a history of aircraft direction and speed. FAR rules governing rights-of-way would govern evasive action taken by the pilot. If a suitable range scale is selected, appropriate to the aircraft speed, no aircraft need ever be allowed to reach the threat range undetected.

Navigation

One's own aircraft position is continuously known and designated. It becomes a simple matter to fly from where you are to where you want to go by watching your progress along the map of the display. Assuming complete coverage of the continental U.S., a long range flight would require only that a desired course be preplanned through each station coverage area. Circumnavigation of storm areas would pose no threat of getting lost. Flight could proceed directly point-to-point. Aircraft position would be known with respect to restricted or other such designated areas. Holding patterns could be flown precisely without regard for wind or timing. Airport traffic patterns can be examined from a distance and proper entry planned. Approaches can be made to airports without letdown facilities; minimum altitudes could be shown along a runway centerline extended, in conjunction with distances from the runway threshold, and obstructions outlined. Approach could be made by following one's own aircraft's progress along the runway centerline extended and conforming to the altitudes at the ranges indicated on the display. All the navigable airspace may be used.

I claim:

1. A pilot data system comprising, a master station consisting of a position-determining network to provide a digital communications link with electromagnetic means suitable for obtaining the three-dimensional position of all aircraft within the system area coverage, circuitry to present said three-dimensional data in digital form and to route it to a digital programmed computer, said computer determining each aircraft's three-dimensional position, display generating equipment capable of generating maps showing topographic detail, cities, and airports, displayed for each of a number of altitude increments, circuitry to mix dynamic data on aircraft positions with the fixed map data on the displays, electromagnetic means, separate from the digital communications link, to broadcast all the resulting altitude increment displays simultaneously from an omni-directional antenna, and aboard each aircraft, a data link with circuitry to receive messages from the master station and to transmit upon interrogation aircraft identification, altitude, and other messages, and also aboard the aircraft, a display receiver capable of receiving and displaying individually all of the displays transmitted from the master station, with additional circuitry to generate an identifying circle and polar grid, each of which is driven by phase-lock-loop circuitry to follow the symbol on the display which represents the aircraft in which installed.

2. A pilot data system comprising, a master station consisting of a position-determining network to provide a digital communication link with digital message encoding and decoding circuitry, transmitting equipment which transmits the encoded messages, at least three slave receiving stations to provide alternate electromagnetic paths for communication between the aircraft and the master station, receiving equipment to receive the aircraft reporting messages, circuitry to measure the time differential between signals traversing the alternate electromagnetic paths and to route the data to a digital programmed computer, said computer determining each aircraft's three-dimensional position, display generating equipment consisting of video recordings of maps showing topographic detail, cities, and airports, displayed for each of a number of altitude increments, circuitry to mix dynamic data on aircraft positions with the fixed map data on the displays, television means, separate from the digital communications link, to broadcast all the resulting altitude increment displays simultaneously from an omni-directional antenna, and aboard each aircraft, a data link with circuitry to receive messages from the master station and to transmit upon interrogation aircraft identification, altitude, and other messages, and also aboard the aircraft, a display receiver capable of receiving and displaying individually all of the displays transmitted from the master station, with additional circuitry to generate an identifying circle and polar grid, each of which is driven by phase-lock-loop circuitry to follow the symbol on the display which represents the aircraft in which installed.

3. A pilot data system, as claimed in claim 2 above, in which the position-determining network, consisting of circuitry for digitally encoding and decoding messages, electromagnetic transmitting and receiving equipment, at least three slave receiving stations to provide alternate paths for communications between the aircraft and position-determining network, circuitry to measure the time differential between signals traversing the alternate electromagnetic paths via the slave stations, and a digital programmed computer, interrogates all aircraft, receives their reports and routes the data to the digital computer which computes each aircraft's three-dimensional position, sorts the aircraft by altitude and further routes the data on each aircraft to the correct altitude increment display.

4. A pilot data system, as claimed in 2 above, in which the slave stations are synchronous satellites.

5. A pilot data system, as claimed in 2 above, in which a digital data link, consisting of circuitry to digitally encode and decode messages, transmitting and receiving equipment, an altimeter with continuous automatic digital readout to the data link transmitter and to the pilot, circuitry to provide continuous automatic aircraft identification in digital form to the data link transmitter, circuitry for automatic actuation of the data link upon engine start-up and automatic entry into the communications system, circuitry to provide a pilot-actuated emergency signal, circuitry to automatically provide a message to the master station when the flight is completed to remove the aircraft from the system and to de-activate the data link, automatically energizes upon engine start-up, automatically transmits a message for entry into the system, reports automatically via the slave stations when interrogated by the master station, performs its emergency function at pilot command, and automatically transmits a flight-completed message and shuts off after a pre-set interval.

6. A pilot data system, as claimed in 2 above, in which a digital programmed computer receives the data on each aircraft in the system from the position-determining network, computes the three-dimensional position of each aircraft, sorts the aircraft by altitude, routes the bearing and distance from the master station of each aircraft to the correct altitude increment display, provides three-dimensional information and emergency symbol display command on non-report-aircraft and aircraft experiencing an in-flight emergency, provides for aircraft entering and leaving the system normally, and provides a keyboard for manual input to the displays.

7. A pilot data system, as claimed in 2 above, in which display generating equipment provides, by previously recorded colored video recordings of colored topographic maps, maps showing topography, cities, airports and obstructions, for a number of altitude increments corresponding to the FAA altitude route structure, provides circuitry to produce alpha-numeric and special symbols as required by the system for display as directed by the computer, and provides circuitry to combine for each altitude increment display the dynamic information on the aircraft with the fixed map information.

8. A pilot data system, as claimed in 2 above, in which the display transmitting equipment simultaneously transmits north-oriented, all the altitude increment displays by a method compatible with the aircraft display receiver and provides means for the display increment for each altitude increment to be selected and displayed individually by the aircraft display receiver.

9. A pilot data system, as claimed in 2 above, in which the aircraft display receiver includes circuitry to individually select and display each of the transmitted altitude increment displays, circuitry to generate alpha-numeric and special symbols for own aircraft identification, a polar grid, and messages, circuitry for the pilot to move these symbols on the display, phase-lock-loop circuitry to drive the said symbols superimposed around the own aircraft symbol on the display, circuitry to permit the pilot to select from several range scales, circuitry to permit the display to be oriented to the aircraft heading, circuitry to permit own aircraft symbol to be placed and remain near the center of the display, circuitry to expand each selected area to fill the entire display at the scale selected, and a computer to provide collision avoidance instructions and REST computations.

10. A pilot data system, as claimed in 2 above, in which the display receiver provides, circuitry which permits the pilot to select and display a square symbol representing an area at the range scale he has selected and to move this symbol to any area of the display he wishes to examine, circuitry for activation which places time-controlled delays into the vertical and horizontal sweeps of the received display resulting in display of only the desired portion of the full received display, and expanded-sweep circuitry to cause the desired area to fill the entire area of the display receiver.

11. A pilot data system, as claimed in 2 above, in which the aircraft display receiver provides, circuitry to generate a circle symbol to identify own aircraft and an optionally selectable polar grid symbol for detecting relative motion of other aircraft, circuitry to enable the pilot to position these symbols, and phase-lock-loop circuitry to drive, after original positioning by the pilot, these symbols superimposed around the symbol on the display denoting own aircraft.

12. A pilot data system, as claimed in 2 above, in which the aircraft display receiver provides circuitry to insert by pilot adjustment a change in time delay corresponding to the north/south, east/west components of the aircraft ground speed, and from sweep to sweep, into the horizontal and vertical trigger delay pulses, resulting in the own aircraft symbol remaining in a fixed position on the display and the full received display appearing to move under the aircraft.

13. A pilot data system, as claimed in 2 above, in which the aircraft display receiver provides means by which the display may be rotated to coincide with the aircraft heading by synthetic rotation of the yoke deflection coil or the deflection plates.

14. A pilot data system, as claimed in 2 above, in which the aircraft display receiver provides means by which the display may be rotated to coincide with aircraft heading by physical rotation of the yoke deflection coil or deflection plates.

15. A pilot data system, as claimed in 2 above, in which the aircraft display receiver is integrated with, a computer and its associated program, circuitry to generate alpha-numeric and special symbols, phase-lock-loop circuitry to lock on and track one or more targets, and an input keyboard, to provide read-out instructions on the display for avoidance of collision with targets being tracked, and read-out of solutions to standard aircraft problems of range, endurance, speed and time.

* * * * *